(12) United States Patent
Akita et al.

(10) Patent No.: US 7,273,678 B2
(45) Date of Patent: Sep. 25, 2007

(54) SECONDARY CELL

(75) Inventors: Hiroyuki Akita, Kobe (JP); Kouichi Satoh, Kobe (JP); Toshiyuki Nohma, Kobe (JP); Ikuo Yonezu, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 572 days.

(21) Appl. No.: 10/484,012

(22) PCT Filed: Mar. 10, 2003

(86) PCT No.: PCT/JP03/02812

§ 371 (c)(1),
(2), (4) Date: Jan. 16, 2004

(87) PCT Pub. No.: WO03/077332

PCT Pub. Date: Sep. 18, 2003

(65) Prior Publication Data

US 2004/0234849 A1 Nov. 25, 2004

(30) Foreign Application Priority Data

Mar. 13, 2002 (JP) ............................... 2002-68178

(51) Int. Cl.
*H01M 2/26* (2006.01)
*H01M 2/02* (2006.01)

(52) U.S. Cl. ........................ 429/211; 429/94; 429/161; 429/164

(58) Field of Classification Search ...................... None
See application file for complete search history.

(56) References Cited

U.S. PATENT DOCUMENTS 3,761,314 A * 9/1973 Cailley ......................... 429/94
4,529,675 A * 7/1985 Sugalski ....................... 429/94
5,532,075 A * 7/1996 Alexandres et al. ........... 429/54

FOREIGN PATENT DOCUMENTS

| EP | 1 076 371 A1 | 2/2001 |
|---|---|---|
| EP | 1 102 337 A1 | 5/2001 |
| EP | 1 134 819 A2 | 9/2001 |
| GB | 1059004 A | 2/1967 |
| JP | 60-7058 A | 1/1985 |
| JP | 61-281457 A | 12/1986 |
| JP | 7-14569 A | 1/1995 |
| JP | 2000-21436 A | 1/2000 |
| JP | 2000-138046 A | 5/2000 |
| JP | 2000-149908 A | 5/2000 |

\* cited by examiner

*Primary Examiner*—John S. Maples
(74) *Attorney, Agent, or Firm*—Kubovcik & Kubovcik

(57) ABSTRACT

A secondary cell comprises an electrode unit housed in a cell can comprising a cylinder having a bottom and a closed opening, and a current collector plate 50 is provided at one end of the electrode unit. The current collector plate 50 has a plurality of protrusions 52 extending radially thereof and joined to an edge of the electrode unit. The surface of the current collector plate 50 to be joined to the bottom wall of the cylinder has a flat region R extending on a predetermined closed-loop track on the surface, and the portions of the current collector plate 50 and the cylinder to be joined are subjected along the flat region R to laser welding from outside the cylinder.

4 Claims, 7 Drawing Sheets

A–A SECTION

B–B SECTION

SECONDARY CELL

TECHNICAL FIELD

The present invention relates to secondary cells which comprise an electrode unit housed in a cylindrical cell can and which are adapted to deliver electric power generated by the electrode unit to the outside via current collector plates.

BACKGROUND ART

Secondary cells comprise a rolled-up electrode unit 2 housed in a cell can 1, for example, as shown in FIG. 11. The cell can 1 comprises a cylinder 15 having a bottom, and a lid 11 fixed to an opening portion of the cylinder 15 with an insulating member 12 fitted therein around the lid. A positive electrode terminal 18 having a safety valve 14 inside thereof is attached to the lid 11 and provides a positive electrode terminal assembly 13. The bottom of the cylinder 15 provides a negative electrode terminal assembly 17.

The rolled-up electrode unit 2 comprises a positive electrode 21, separator 22 and negative electrode 23 which are each in the form of a strip. The positive and negative electrodes 21, 23 are lapped over respective separators 22, displaced from the separator widthwise thereof, and rolled up into a spiral form. At one of axial opposite ends of the rolled-up electrode unit 2, an edge of the positive electrode 21 projects outward beyond the corresponding edge of the separator 22, and at the other end of the unit, an edge of the negative electrode 23 projects outward beyond the corresponding edge of the separator 22. Current collector plates 9, 16 are arranged at the respective opposite ends of the electrode unit 2 and each welded to the projecting edge of the positive electrode 21 or negative electrode 23.

The current collector plate 9 joined to the edge of the positive electrode 21 comprises a flat disk 93 and a lead portion 91 in the form of a strip projecting therefrom. The lead portion 91 is welded at an outer end thereof to the lid 11. On the other hand, the current collector plate 16 joined to the edge of the negative electrode 23 is in the form of a disk, provided on the bottom wall of the cylinder 15 and welded to the bottom wall. The rolled-up electrode unit 2 generates electric power, which can be delivered to the outside through the positive electrode terminal assembly 13 and negative electrode terminal assembly 17.

For such secondary cells to deliver an improved output, the current path through which the electric power generated by the rolled-up electrode unit 2 is delivered to the outside must be minimized in electric resistance, i.e., in internal resistance. Especially the nonaqueous electrolyte secondary cells for use as power sources for electric vehicles need to be reduced in internal resistance to the greatest possible extent so as to be of high capacity and to deliver a great output.

However, the secondary cell having the current collector structure shown in FIG. 11 has the problem that since the edge of a current collector forming each of the positive electrode 21 and the negative electrode 23 of the electrode unit 2 is small in area, the area of contact of the current collector edge with the current collector plate is small, consequently giving increased internal resistance to the cell.

To realize reduced internal resistance, the present applicant has contrived the current collector structure shown in FIG. 6 (see JP-A No. 2001-256952). As shown in FIG. 6, the current collector plate 5 to be disposed on the positive electrode side of a rolled-up electrode unit 4 comprises a flat body 51 having a center hole 54. The body 51 is integrally provided with a plurality of circular-arc protrusions 52 extending radially from the center hole 54 and protruding toward the electrode unit 4. A plurality of raised pieces 53 are formed by slitting between each pair of adjacent circular-arc protrusions 52, 52 to project toward the electrode unit 4. The body 51 further has a lead portion 55 in the form of a strip formed integrally therewith at an end portion. The current collector plate 50 to be disposed on the negative electrode side of the electrode unit 4 also has the same construction as described above.

In the process for fabricating the secondary cell having the current collector structure described above, the current collector plate 5 for the positive electrode is pressed against current collector edge portions 48 formed at one end of the rolled-up electrode unit 4 as shown in FIGS. 7 and 9. This causes each circular-arc protrusion 52 of the current collector plate 5 to bite into the current collector edge portions 48 of the unit 4 as shown in FIG. 8, forming a joint face in the form of a cylindrical face between the protrusion 52 and the current collector edge portions 48. Each raised piece 53 of the current collector plate 5 bites deep into the current collector edge portions 48 of the electrode unit 4 as shown in FIG. 10 and is brought into pressing contact with the current collector edge portions 48.

In this state, a laser beam is projected onto the inner surface of the circular-arc protrusion 52 of the current collector plate 5 as indicated by arrows in FIG. 8 for laser welding. As a result, the protrusion 52 of the current collector plate 5 and the current collector edge 48 of the electrode unit 4 are welded to each other over a large area of contact, with the raised piece 53 shown in FIG. 10 held in pressing contact with the current collector edge 48. The current collector plate 50 for the negative electrode is also similarly welded to the electrode unit 4.

With the secondary cell described, each circular-arc protrusion 52 is welded to the current collector edge portions 48 over large contact areas of the current collector plate 5, 50, and each raised piece 53 is effectively in contact with the current collector edge portions 48 by biting into these current collector edge portions 48 in edge areas other than the weld joint areas. This results in reduced resistance of contact between the current collector plate 5 and the rolled-up electrode unit 4. Additionally, current is collected from the entire area of the current collector edge 48 by the raised pieces 53 formed on the current collector plate 5 to achieve high current collection efficiency.

The process for fabricating the secondary cell having the above current collector structure includes the step of joining the current collector plate 50 for the negative electrode to the bottom wall of the cylinder 15 from outside the cylinder 15 by laser welding, with the current collector plate 50 placed on the cylinder bottom portion.

However, the current collector plate 50 has circular-arc protrusions 52 protruding toward the electrode unit 4 as shown in FIG. 6 and slits (not shown) for forming the raised pieces 53, with noncontact regions provided locally between the surface of the current collector plate 50 and the bottom wall of the cylinder 15. If the noncontact regions are subjected to laser welding, the cylinder 15 is therefore likely to melt to produce holes at these regions.

Accordingly, an object of the present invention is to provide a secondary cell wherein an electrode unit is satisfactorily in contact with current collector plates to ensure high current collection efficiency and which can be fabricated by welding the current collector plate to the bottom wall of a cell can without the likelihood that holes will be formed in the cell can.

DISCLOSURE OF THE INVENTION

The present invention provides a secondary cell having an electrode unit 4 which comprises in superposed layers a positive electrode 41 in the form of a strip, a negative electrode 43 in the form of a strip and a separator 42 interposed therebetween, and which is housed in a cell can 1 comprising a bottomed cylinder 15 and a lid 11 closing an opening portion of the cylinder. The positive electrode 41 and the negative electrode 43 each comprise a current collector in the form of a strip coated with an active material over the surface thereof.

The current collector in the form of a strip forming the positive electrode 41 or the negative electrode 43 has a projecting edge 48 at at least one of opposite ends of the electrode unit 4 which one end is opposed to a bottom wall of the cylinder 15. A current collector plate 50 covers the edge 48 and has a plurality of protrusions 52 extending radially of the current collector plate and protruding toward the current collector edge 48, the protrusions 52 biting into the current collector edge 48 and being welded to the current collector edge 48. The current collector plate 50 is welded to the bottom wall of the cylinder 15.

The surface of the current collector plate 50 to be joined to the cylinder 15 has a flat region R extending on a predetermined closed-loop track on the surface, and the portions of the current collector plate 50 and the cylinder 15 to be joined are subjected along the flat region R to laser welding from outside the cylinder 15.

In fabricating the secondary cell of the invention, the current collector plate 50 is pressed against the current collector edge 48 of the electrode unit 4 in a rolled-up form, whereby each protrusion 52 is caused to bite into the current collector edge 48, forming at current collector edge portions 48 a joint face shaped in conformity with the surface shape of the protrusion 52 to ensure satisfactory contact between the current collector plate 50 and the current collector edge 48.

The current collector plate 50 is welded to the current collector edge 48 by projecting a laser beam or electron beam onto the portions of the each protrusion 52 of the current collector plate 50 and the current collector edge 48 to be joined, whereby the current collector plate 50 is joined to the current collector edge 48 over large areas of contact. This results in reduced contact resistance to achieve high current collection efficiency.

Further in welding the current collector plate 50 to the bottom wall of the bottomed cylinder 15, the portions of the current collector plate 50 and the cylinder 15 to be joined are subjected to laser welding from outside the cylinder 15. The current collector plate 50 has the flat region R extending on the predetermined closed-loop track, and the flat region R and the bottom wall of the cylinder 15 are in intimate contact with each other, so that the laser beam applied to the portions to be joined for welding is unlikely to produce holes in the cylinder 15. Since the flat region R to be welded with a laser beam extends along the specified closed-loop track, the position of this region R can be recognized even from outside the cylinder 15.

In the case where the protrusions 52 of the current collector plate 50 are formed radially on the surface of the current collector plate 50 opposed to the rolled-up electrode unit 4, only the portions of intersection of the protrusions 52 with the closed-loop track may be made flat.

Further in the case where the cell can 1 is in the form of a cylinder, and the current collector plate 50 is in the form of a disk, the flat region R is formed along a circumferential line having a predetermined radius and extending around the center of the current collector plate 50. The position of the flat region then remains unchanged even if the rolled-up electrode unit 4 and the current collector plate 50 rotate inside the cell can 1, with the result that when the laser beam is moved along the circumferential line having the predetermined radius, the current collector plate 50 can be reliably welded at the flat region R to the cylinder 15.

Thus, the secondary cell of the present invention achieves high current collection efficiency, while the cell can be fabricated without producing any hole in the cell can when the current collector plate is welded to the bottom wall of the can.

BEST MODE OF CARRYING OUT THE INVENTION

Figure 1:
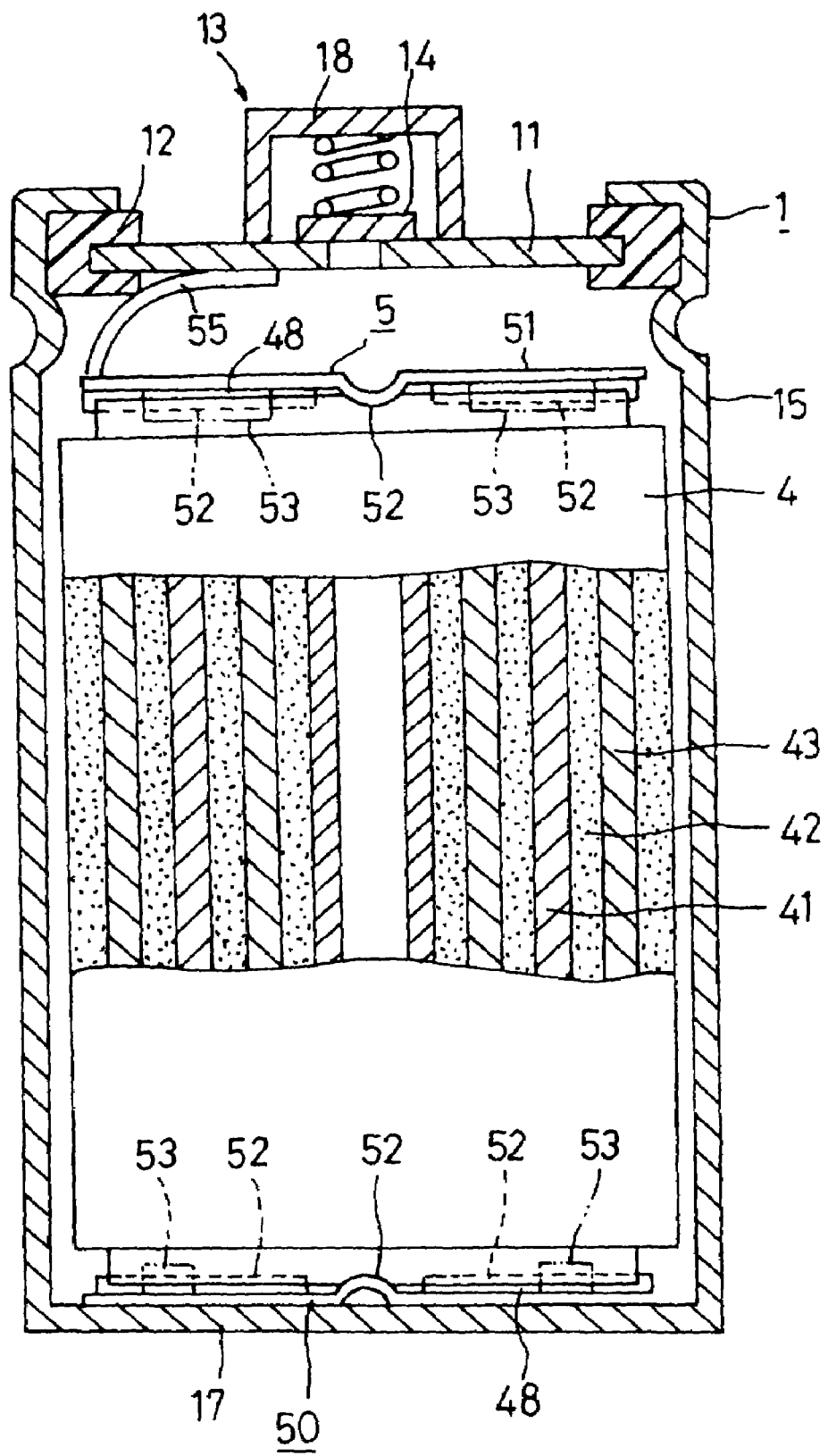
FIG. 1 is a front view partly broken away and showing a secondary cell of the invention.

An embodiment of the invention will be described below in detail with reference to the drawings. FIG. 1 shows a secondary cell embodying the invention and comprising a rolled-up electrode unit 4 housed in a cylindrical cell can 1 prepared from a base material of steel plated with nickel over the surface thereof. The cell can 1 comprises a cylinder 15 having a bottom, and a lid 11 fixed to an opening portion of the cylinder 15, with an insulating member 12 fitted therein around the lid. The cell can 1 is 30 mm in outside diameter and 65 mm in length. A positive electrode terminal 18 having a safety valve 14 inside thereof is attached to the lid 11 of the can 1 and provides a positive electrode terminal assembly 13. The bottom of the cylinder 15 provides a negative electrode terminal assembly 17.

Figure 6:
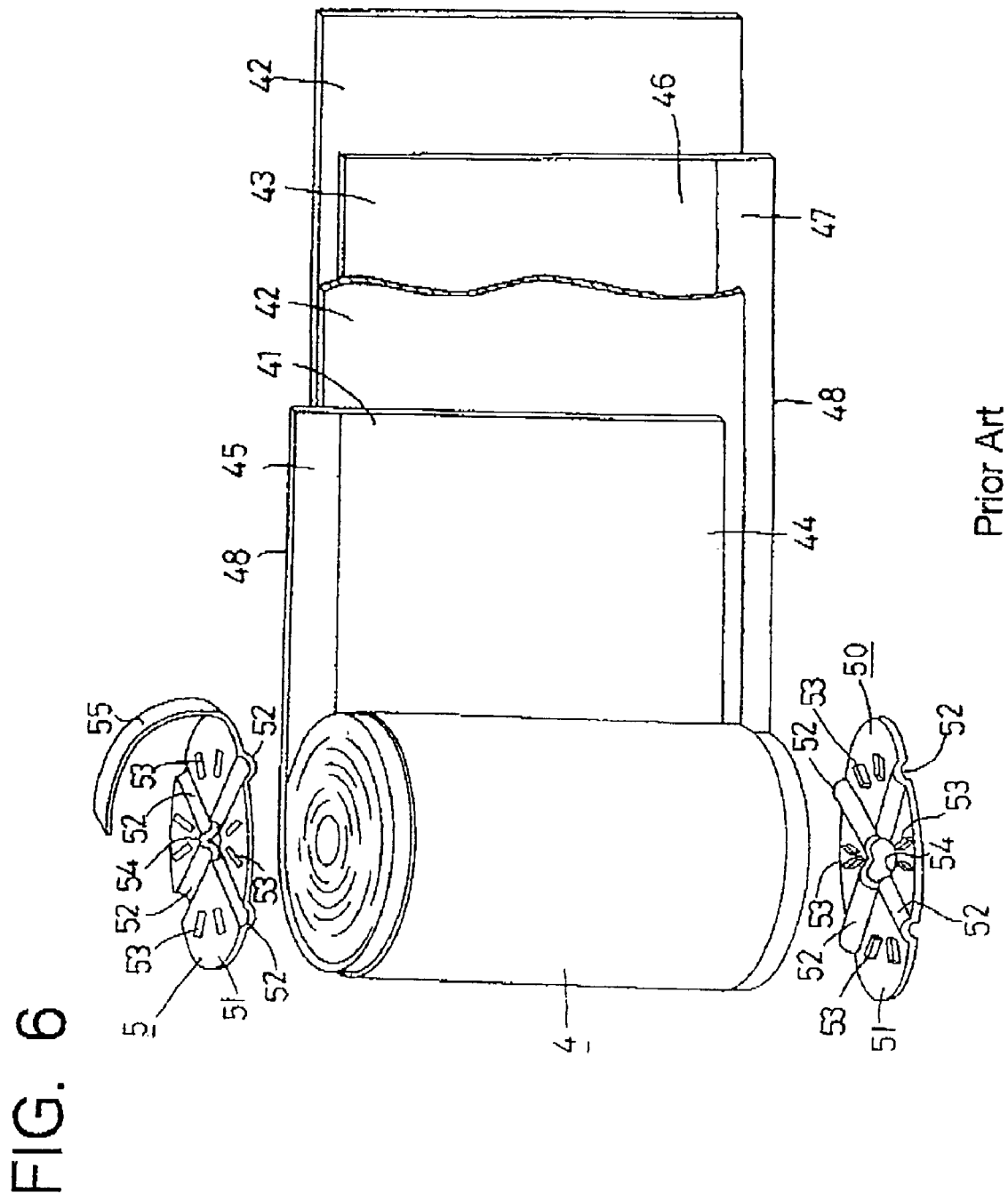
FIG. 6 is a perspective view partly in development and showing a rolled-up electrode unit.

The rolled-up electrode unit 4 comprises a positive electrode 41 and a negative electrode 43 which are each in the form of a strip, and a separator 42 in the form of a strip interposed therebetween as shown in FIG. 6. The assembly of these components is rolled up in a spiral form into the electrode unit. The positive electrode 41 comprises a current collector 45, in the form of a strip, of aluminum foil which is coated over opposite surfaces thereof with a positive electrode active material 44 containing lithium cobalt oxide. The negative electrode 43 comprises a current collector 47, in the form of a strip, of copper foil which is coated over opposite surfaces thereof with a negative electrode active material 46 containing a carbon material. The separator 42 is impregnated with a nonaqueous electrolyte.

The positive electrode 41 has a coated portion coated with the positive electrode active material 44 and a noncoated portion not coated with the active material. The negative electrode 43 also has a coated portion coated with the negative electrode active material 46 and a noncoated portion not coated with the active material.

The positive electrode 41 and the negative electrode 43 are lapped over respective separators 42 as displaced widthwise thereof, with the noncoated portions of the positive electrode 41 and the negative electrode 43 projecting outward beyond the respective opposite edges of the separator 42. The assembly is rolled up in a spiral form into the electrode unit 4. At one of the axial opposite ends of this rolled-up electrode unit 4, an edge 48 of the current collector of noncoated portion of the positive electrode 41 projects outward beyond the one edge of the separator 42, and at the other end of the unit 4, an edge 48 of the current collector of the noncoated portion of the negative electrode 43 projects outward beyond the other edge of the separator 42. Current collector plates 5, 50 are arranged respectively at opposite ends of the rolled-up electrode unit 4 and welded to the respective edges 48, 48 of the positive electrode 41 and the negative electrode 43.

Figure 4:
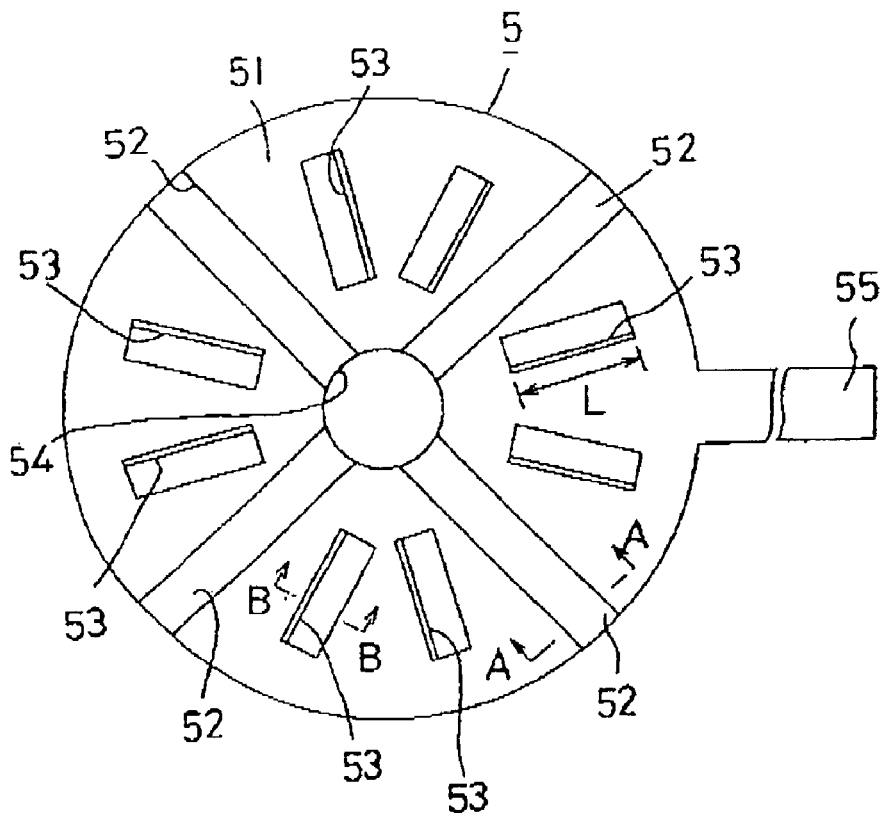
FIG. 4 is a plan view of a current collector plate for a positive electrode.
Figure 5:
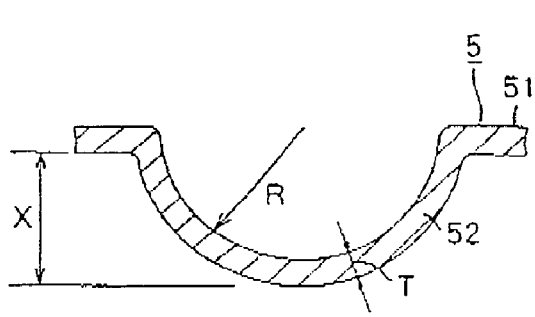
FIG. 5 includes fragmentary views in section of the current collector plate.
Figure 5:
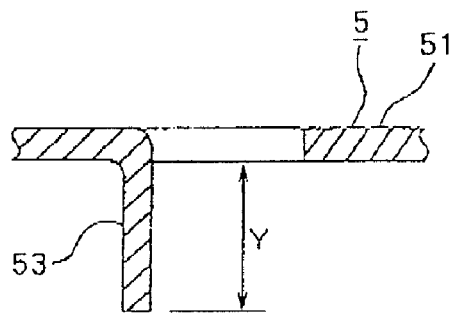

With reference to FIGS. 4 and 5, the current collector plate 5 for the positive electrode comprises a flat body 51 of aluminum having a circular contour and a center hole 54. The flat body 51 is integrally provided with a plurality of (i.e., four, according to the embodiment) circular-arc protrusions 52 radially extending from the center hole 54 and protruding toward the electrode unit 4. The flat body 51 further has a plurality of (i.e., two, according to the embodiment) raised pieces 53 formed by slitting between each pair of adjacent circular-arc protrusions 52, 52 and projecting toward the electrode unit 4. The flat body 51 further has a lead portion 55 in the form of a strip integrally formed with an end portion thereof.

Figure 2:
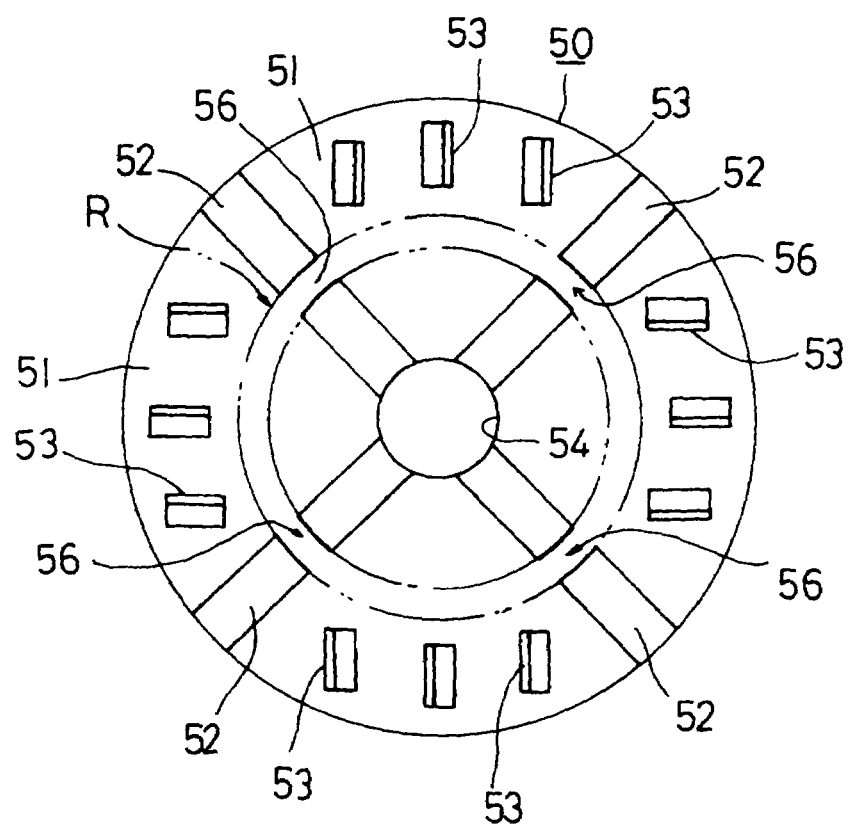
FIG. 2 is a plan view of a current collector plate for a negative electrode.

On the other hand, the current collector plate 50 for the negative electrode comprises a flat body 51 of copper having a circular contour and a center hole 54 as seen in FIG. 2. The flat body 51 is integrally provided with a plurality of (i.e., four, according to the embodiment) circular-arc protrusions 52 radially extending from the center hole 54 and protruding toward the electrode unit 4. The flat body 51 further has a plurality of (i.e., three, according to the embodiment) raised pieces 53 formed by slitting between each pair of adjacent circular-arc protrusions 52, 52 and projecting toward the electrode unit 4.

Figure 3:
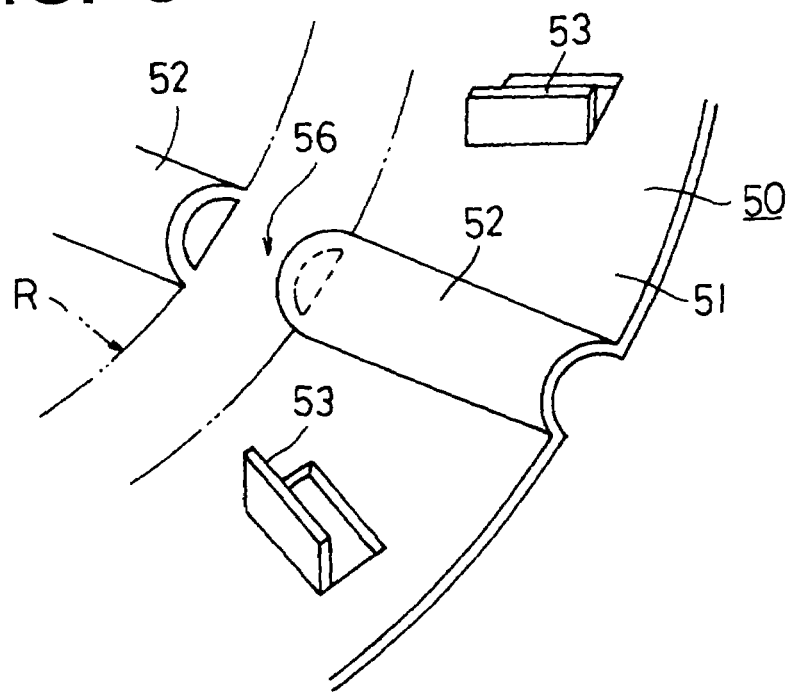
FIG. 3 is a fragmentary perspective view of the current collector plate.

The flat body 51 of the current collector plate 50 is further provided, on the surface thereof to be joined to the bottomed cylinder 15, with a flat region R extending on a circular closed-loop track having a predetermined radius and provided around the center hole 54. Each circular-arc protrusion 52 of the current collector plate 50 has at the intersection thereof with the closed-loop track a flat portion 56 flush with the surface of the flat body 51 as shown in FIG. 3. The raised pieces 53 are formed outside the flat region R. Accordingly, the flat region is in intimate contact with the bottom surface of the cylinder 15 when the current collector plate 50 is placed on the bottom of the cylinder 15 as shown in FIG. 1.

Figure 7:
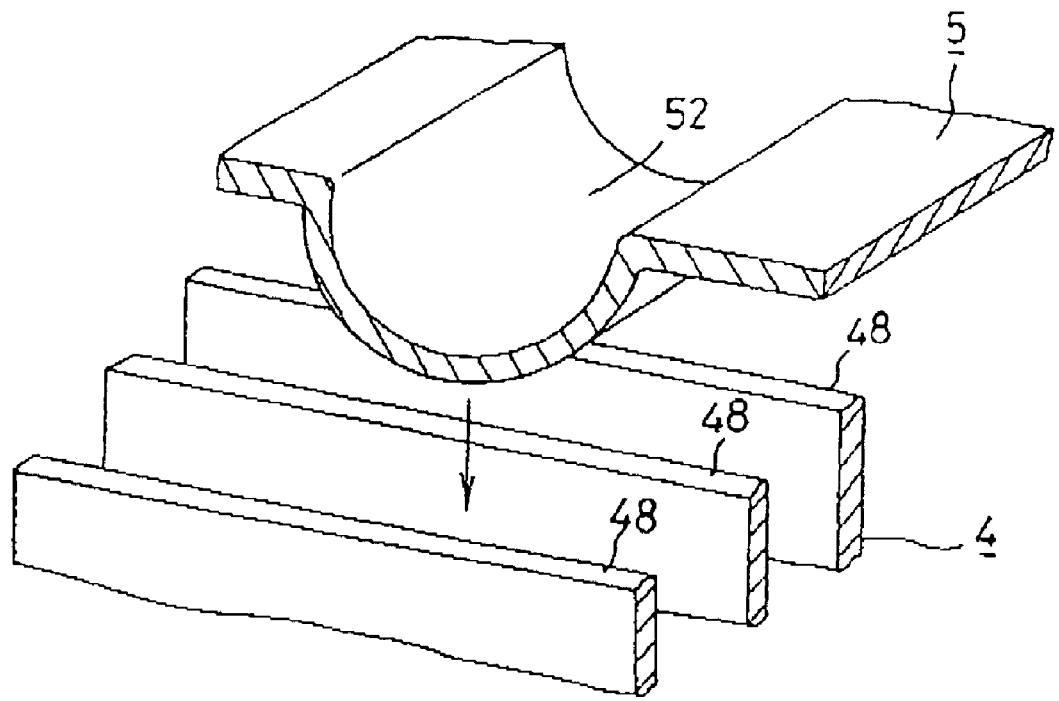
FIG. 7 is an enlarged perspective view showing the step of pressing a circular-arc protrusion of the current collector plate against current collector edge portions of the rolled-up electrode unit.
Figure 8:
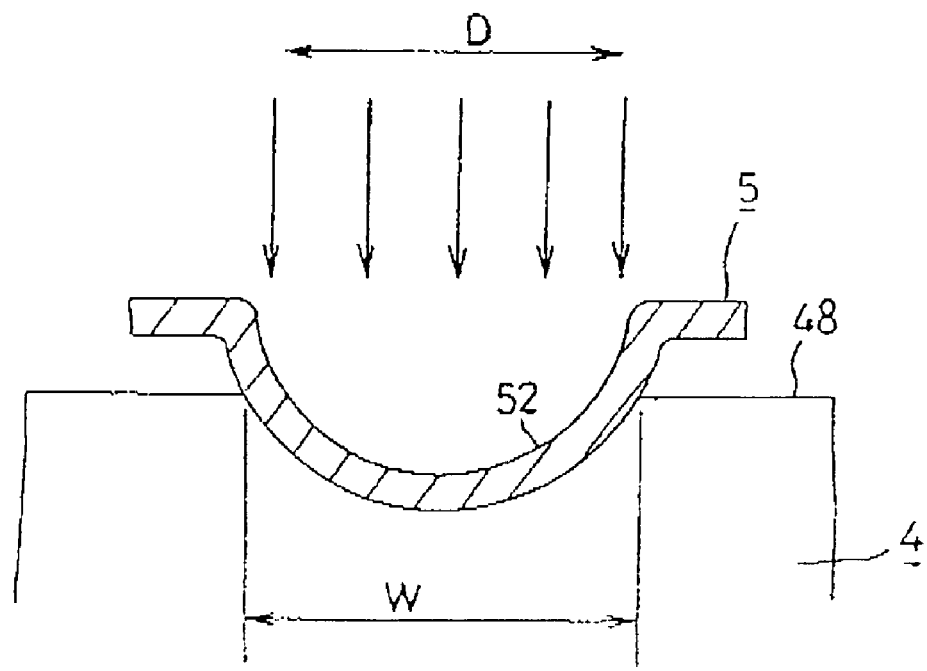
FIG. 8 is an enlarged perspective view showing the circular-arc protrusion of the current collector plate as pressed against the current collector edge portions of the rolled-up electrode unit.
Figure 9:
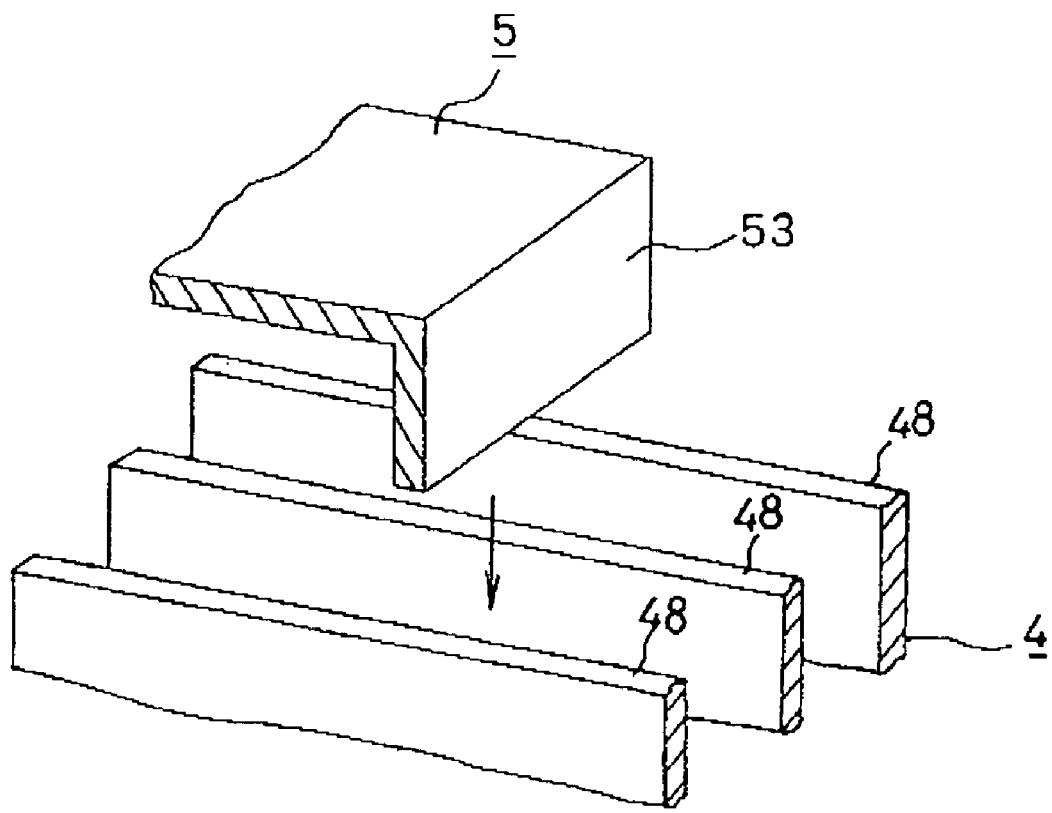
FIG. 9 is an enlarged perspective view showing the step of pressing a raised piece of the current collector plate against the current collector edge portions of the rolled-up electrode unit.
Figure 10:
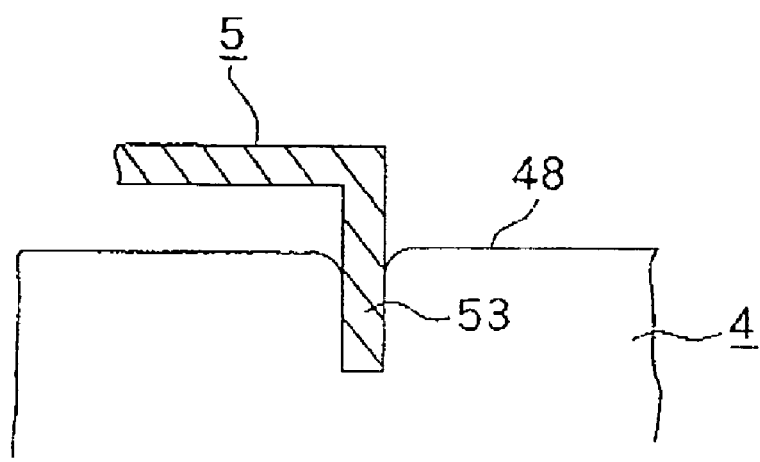
FIG. 10 is an enlarged perspective view showing the raised piece of the current collector plate as pressed against the current collector edge portions of the rolled-up electrode unit.
Figure 11:
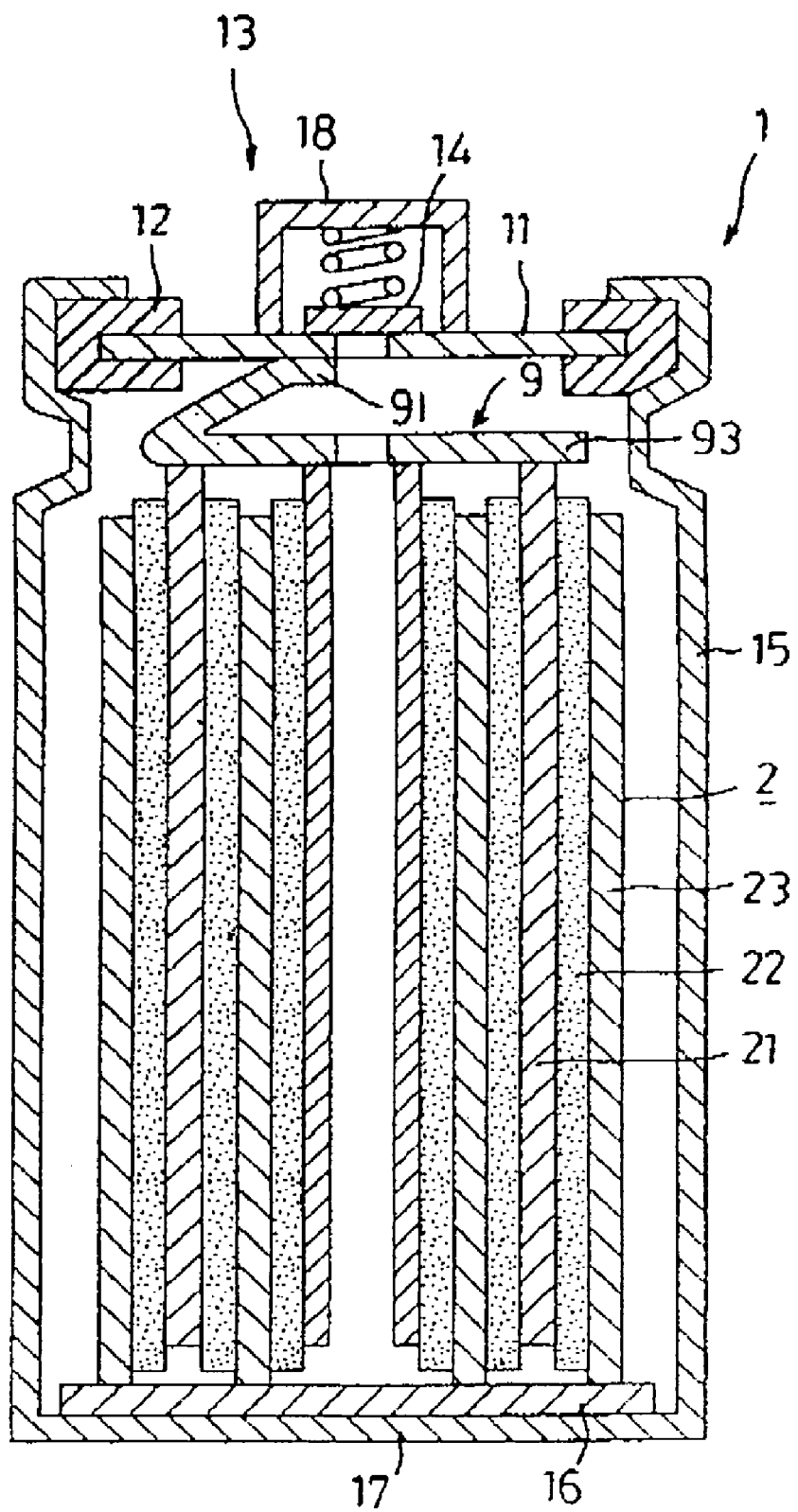
FIG. 11 is a view in section of a conventional secondary cell.

In the process for fabricating the secondary cell of the invention, the current collector plate 5 for the positive electrode is pressed against current collector edge portions 48 provided at an end portion of the rolled-up electrode unit 4 as shown in FIGS. 7 and 9. This causes each circular-arc protrusion 52 of the current collector plate 5 to bite into the current collector edge portions 48 of the unit 4 as shown in FIG. 8, forming a joint face in the form of a cylindrical face between the protrusion 52 and the current collector edge portions 48. Each raised piece 53 of the current collector plate 5 bites deep into the current collector edge portions 48 of the electrode unit 4 as shown in FIG. 10 and is brought into pressing contact with the current collector edge portions 48.

In this state, a laser beam is projected onto the inner surface of the circular-arc protrusion 52 of the current collector plate 5 as indicated by arrows in FIG. 8 for laser welding. As a result, the protrusion 52 of the current collector plate 5 and the current collector edge 48 of the electrode unit 4 are welded to each other over a large area of contact, with the raised piece 53 shown in FIG. 10 held in pressing contact with the current collector edge 48. The current collector plate 50 for the negative electrode is also similarly welded to the electrode unit 4.

With the current collector plates 5, 50 thus welded to the respective ends of the rolled-up electrode unit 4, the electrode unit 4 is placed into the bottomed cylinder 15 as shown in FIG. 1. The portion of the current collector plate 50 to be joined to the cylinder 15 is then subjected to laser welding from outside the cylinder 15 to join the current collector plate 50 to the bottom wall of the cylinder 15. At this time, the laser beam is moved along the flat region of the current collector plate 50. The radius of the closed-loop track on which the flat region extends is known, and the position of the flat region remains unchanged even if the electrode unit 4 and the current collector plate 50 rotate inside the cylinder 15, so that the position of the flat region can be recognized accurately even from outside the cylinder 15. Consequently, the current collector plate 50 is reliably welded at the flat region to the bottom wall of the cylinder 15.

With the lead portion 55 extending from the current collector plate 5 and welded at its outer end to the rear surface of the lid 11 which has the positive electrode terminal 18 attached thereto, the lid 11 is finally fixed to the opening portion of the cylinder 15 by crimping to complete the secondary cell of the invention.

In fabricating the secondary cell of the invention, there is no likelihood that holes will be formed in the cylinder 15 when the current collector plate 50 is welded to the bottom wall of the cylinder 15. The current collector plates 5, 50 are joined to the respective current collector edges 48 over increased areas of contact by weld joints between the circular-arc protrusions 52 and the current collector edges 48, and at portions other than the weld joints, the raised pieces 53 wedge into current collector edge portions 48 to ensure satisfactory contact, with the result that contact between the current collector plate 5 and the rolled-up electrode unit 4 involves reduced resistance. The raised pieces 53 formed on the current collector plates 5, 50 serve to collect current from the entire areas of the current collector edges 48 to achieve high current collection efficiency.

The cell of the present invention is not limited to the foregoing embodiment in construction but can be modified variously within the technical scope defined in the appended claims. For example, in the step of joining the current collector plate 50 to the bottom wall of the cylinder 15, the flat region R need not always be subjected to laser welding over the entire length thereof but can be welded with a laser beam locally.

The invention claimed is:

1. A secondary cell having an electrode unit (4) comprising in superposed layers a positive electrode (41) in the form of a strip, a negative electrode (43) in the form of a strip and a separator (42) interposed therebetween, the electrode unit (4) being housed in a cell can (1) comprising a bottomed cylinder (15) and a lid (11) closing an opening portion of the cylinder, a current collector in the form of a strip forming the positive electrode (41) or the negative electrode (43) and having a projecting edge (48) at at least one of opposite ends of the electrode unit (4) which one end is opposed to a bottom wall of the cylinder (15), a current collector plate (50) covering the edge (48) and comprising a plate having a plurality of protrusions (52) extending radially outward from the center of the plate and protruding toward the current collector edge (48), the protrusions (52) biting into the current collector edge (48) and being welded to the current collector edge (48), the current collector plate (50) being welded to the bottom wall of the cylinder (15), the secondary cell being characterized in that a surface of the current collector plate (50) to be joined to the cylinder (15) has a flat region R extending on a predetermined closed-loop track on the surface intermediate the center and outer edge of the current collector plate and intersecting the plurality of radially extending protrusions, portions of the current collector plate (50) and the cylinder (15) to be joined being subjected along the flat region R to laser welding from outside the cylinder (15).

2. A secondary cell according to claim 1 wherein the protrusions (52) of the current collector plate (50) are formed radially on a surface thereof opposed to the electrode unit (4), and the portion of each protrusion (52) intersecting the closed-loop track is flat.

3. A secondary cell according to claim 1 wherein the cell can (1) is in the form of a cylinder, and the current collector plate (50) is In the form of a disk, the predetermined closed-loop track extending on a circumference around a center of the current collector plate (50).

4. A secondary cell according to claim 2 wherein the cell can (1) is in the form of a cylinder, and the current collector plate (50) is In the form of a disk, the predetermined closed-loop track extending on a circumference around a center of the current collector plate (50).

* * * * *